United States Patent
Pelliconi et al.

(10) Patent No.: US 8,008,400 B2
(45) Date of Patent: *Aug. 30, 2011

(54) POLYOLEFIN MASTERBATCH AND COMPOSITION SUITABLE FOR INJECTION MOLDING

(75) Inventors: Anteo Pelliconi, S. M. Maddalena (IT); Enea Garagnani, Ferrera (IT); Gerald J. Ennis, Oxford, PA (US)

(73) Assignee: Basell Poliolenfine Italia s.r.l., Milan (IT)

( * ) Notice: Subject to any disclaimer, the term of this patent is extended or adjusted under 35 U.S.C. 154(b) by 1509 days.

This patent is subject to a terminal disclaimer.

(21) Appl. No.: 10/551,679

(22) PCT Filed: Mar. 29, 2004

(86) PCT No.: PCT/EP2004/003304
§ 371 (c)(1),
(2), (4) Date: Sep. 29, 2005

(87) PCT Pub. No.: WO2004/087805
PCT Pub. Date: Oct. 14, 2004

(65) Prior Publication Data
US 2006/0194924 A1    Aug. 31, 2006

Related U.S. Application Data

(60) Provisional application No. 60/473,671, filed on May 23, 2003.

(30) Foreign Application Priority Data

Apr. 2, 2003  (EP) ........................ 0307962

(51) Int. Cl.
*C08L 9/00* (2006.01)
*C08L 23/04* (2006.01)
*C08L 23/10* (2006.01)

(52) U.S. Cl. .......................... 525/191; 525/232; 525/240

(58) Field of Classification Search ............... 525/191, 525/232, 240
See application file for complete search history.

(56) References Cited

U.S. PATENT DOCUMENTS

| 4,399,054 | A | 8/1983 | Ferraris et al. | 252/429 B |
|---|---|---|---|---|
| 5,145,819 | A | 9/1992 | Winter et al. | 502/117 |
| 5,324,800 | A | 6/1994 | Welborn, Jr. et al. | 526/160 |
| 5,519,090 | A | 5/1996 | Schwager et al. | 525/240 |
| 6,441,094 | B1 | 8/2002 | Cecchin et al. | 525/191 |
| 6,586,531 | B2 * | 7/2003 | Washiyama et al. | 525/240 |

FOREIGN PATENT DOCUMENTS

| EP | 0045977 | 2/1982 |
|---|---|---|
| EP | 0129368 | 12/1984 |
| EP | 0361493 | 4/1990 |
| EP | 0416815 | 3/1991 |
| EP | 0420436 | 4/1991 |
| EP | 0485823 | 5/1992 |
| EP | 0643066 | 3/1995 |
| EP | 0671404 | 9/1995 |
| EP | 0674991 | 10/1995 |
| EP | 0728769 | 8/1996 |
| EP | 0782587 | 7/1997 |
| WO | 9104257 | 4/1991 |
| WO | 0228958 | 4/2002 |
| WO | 03076511 | 9/2003 |

* cited by examiner

*Primary Examiner* — Nathan M Nutter
(74) *Attorney, Agent, or Firm* — Dilworth IP, LLC

(57) ABSTRACT

A masterbatch composition comprising (percent by weight): A) 50%-90% of a crystalline polypropylene component comprising: $A^I$) from 25% to 75% of a fraction having a melt flow rate $MFR^I$ of from 0.1 to 10 g/10 min.; and $A^{II}$) from 75% to 25% of a fraction having a melt flow rate value $MFR^{II}$ equal to or lower than 100 g/10 min.; wherein the ratio $MFR^I/MFR^{II}$ is from 5 to 60; and B) 10%-50% of a copolymer component of ethylene and at least one $C_3$-$C_{10}$ α-olefin, containing from 15% to 50% of ethylene; said masterbatch composition having a value of the intrinsic viscosity [η] of the fraction soluble in xylene at room temperature equal to or higher than 3.5 dl/g, is added to polyolefin materials to obtain final compositions suitable for injection molding.

7 Claims, No Drawings

POLYOLEFIN MASTERBATCH AND COMPOSITION SUITABLE FOR INJECTION MOLDING

This application is the U.S. national phase of International Application PCT/EP2004/003304, filed Mar. 29, 2004, claiming priority to European Patent Application 03075962.5 filed Apr. 2, 2003, and the benefit under 35 U.S.C. 119(e) of U.S. Provisional Application No. 60/473,671, filed May 23, 2003; the disclosures of International Application PCT/EP2004/003304, European Patent Application 03075962.5 and U.S. Provisional Application No. 60/473,671, each as filed, are incorporated herein by reference.

The present invention relates to a polyolefin masterbatch which can be used to prepare polyolefin compositions suitable for injection molding into relatively large articles. More particularly, the polyolefin compositions can be injection molded into large objects which exhibit improved surface properties, particularly with respect to reduction of tiger striping and gels.

Polypropylene and thermoplastic polyolefins have enjoyed wide commercial acceptance because of their outstanding cost/performance characteristics. For example, these polymers are used in molded-in color applications because of their good weatherability.

Polypropylene and thermoplastic polyolefins are generally injection molded into desired articles. Relatively large parts, such as automobile bumpers and fascia, offer particularly challenging problems such as cold flow, tiger striping and gels. "Cold flow" occurs when the molten polymer being injected into a mold begins to cool and solidify before the mold is completely filled with the polymer. "Tiger striping" refers to color and gloss variations on the surface of an injection molded article, which occur because of unstable mold filling properties of the molten polymer as it is being injected into the mold and formed into the desired shape. "Gels" refers to small dots appearing at the surface of the final shaped article, due to relatively poor dispersion of one or more polymeric components. Such gels, together with tiger stripes, have the effect of worsening the surface appearance of the final shaped article.

An advantage of using a masterbatch composition is that it can be added to many and different kinds of polylefins to achieve a final polyolefin composition ready for production, by injection molding, of large articles such as automobile bumpers. Thus there is a constant need for masterbatch compositions able to produce, by blending with various polyolefin materials, final compositions exhibiting a good balance of physical and surface properties.

In U.S. Pat. No. 5,519,090 it is taught that a good melt flowability and good mechanical properties, in particular high rigidity, can be achieved by blending together two polypropylenes with different values of melt flow index and a propylene/ethylene copolymer.

According to WO 02/28958, a particularly good balance of melt flowability, mechanical properties and surface properties, with particular reference to reduction of tiger stripes, is achieved by adding to a polyolefin matrix a masterbatch composition comprising (percent by weight):
A) 20%-90% of a crystalline polypropylene component containing from 25% to 75% of a fraction $A^I$ having a melt flow rate $MFR^I$ of from 0.5 to 10 g/10 min., and from 75% to 25% of a fraction $A^{II}$ having a melt flow rate $MFR^{II}$ such that a ratio $MFR^{II}/MFR^I$ is from 30 to 2000; and wherein fractions $A^I$ and $A^{II}$ are independently selected from the group consisting of a propylene homopolymer, a random copolymer of propylene containing up to 8% of ethylene, and a random copolymer of propylene containing up to 8% of at least one $C_4$-$C_{10}$ α-olefin; and
B) 10%-80% of a copolymer component of ethylene and at least one $C_3$-$C_{10}$ α-olefin, the copolymer containing from 10 to 70% of ethylene, and optionally minor amounts of a diene, said copolymer being soluble in xylene at room temperature, and having an intrinsic viscosity [η] of from 4 to 9 dl/g.

It has now been found that by properly selecting the melt flow rate values of the polypropylene components, in combination with other features relating to the composition and the proportions of the various components, it is possible to obtain a masterbatch composition with a particularly valuable set of physical and mechanical properties and particularly suited for preparing final polyolefin compositions having excellent surface appearance, due to reduction of tiger stripes and absence of gels.

Thus the present invention relates to a masterbatch composition, comprising (percent by weight):
A) 50%-90%, preferably 55-80%, of a crystalline polypropylene component comprising:
  $A^I$) from 25% to 75%, preferably from 30% to 70%, of a fraction having a melt flow rate $MFR^I$ of from 0.1 to 10 g/10 min., preferably from 0.1 to 5 g/10 min., more preferably from 0.1 to 3 g/10 min.; and
  $A^{II}$) from 25% to 75%, preferably from 30% to 70%, of a fraction having a melt flow rate value $MFR^{II}$ equal to or lower than 100 g/10 min., in particular from 5 to 100 g/10 min., preferably from 10 to 100 g/10 min., more preferably from 10 to 68 g/10 min.;
wherein the ratio $MFR^{II}/MFR^I$ (i.e. the value of the ratio of the MFR value of ($A^{II}$) to the MFR value of ($A^I$)) is from 5 to 60, preferably from 10 to 55, and the fractions ($A^I$) and ($A^{II}$) are independently selected from the group consisting of a propylene homopolymer, a random copolymer of propylene containing up to 3% of ethylene, and a random copolymer of propylene containing up to 6% of at least one $C_4$-$C_{10}$ α-olefin; and
B) 10%-50%, preferably 20-45%, of a copolymer component of ethylene and at least one $C_3$-$C_{10}$ α-olefin, the copolymer containing from 15% to 50%, preferably from 20% to 48%, more preferably from 25% to 38% of ethylene, and optionally minor amounts of a diene;
said masterbatch composition having a value of the intrinsic viscosity [η] of the fraction soluble in xylene at room temperature (about 25° C.) equal to or higher than 3.5 dl/g, in particular from 3.5 to 9 dl/g, preferably from 4 to 8 dl/g.

The MFR values are measured according to ASTM-D 1238, condition L (230° C., with 2.16 kg load).

The melt flow rate of the masterbatch composition can preferably range from 0.1 to 10 g/10 min., more preferably from 0.1 to 5 g/10 min.

Illustrative $C_4$-$C_{10}$ α-olefins that can be present in ($A^I$) and/or ($A^{II}$) include 1-butene, 1-pentene, 1-hexene, 4-methyl-1-pentene and 1-octene, with 1-butene being particularly preferred.

Preferably both ($A^I$) and ($A^{II}$) are propylene homopolymers.

Among the $C_3$-$C_{10}$ α-olefins that are present in the copolymer component (B), propylene is preferred.

Other preferred features for the masterbatch compositions of the present invention are:
  P.I. (Polydispersity Index) of (A) from 4 to 7;
  Mw/Mn values for both ($A^I$) and ($A^{II}$) higher than 4, more preferably higher than 4.5, in particular higher than 5 (measured by gel permeation chromathography in trichlorobenzene at 135° C.);

amount of fraction soluble in xylene at room temperature of the overall composition lower than 35% by weight.

The masterbatch composition of the present invention can be prepared by a sequential polymerization, comprising at least three sequential steps, wherein components (A) and (B) are prepared in separate subsequent steps, operating in each step, except the first step, in the presence of the polymer formed and the catalyst used in the preceding step. The catalyst is added only in the first step, however its activity is such that it is still active for all the subsequent steps.

In particular, component (A) requires two sequential steps, one for preparing the fraction ($A^I$) and the other for preparing the fraction ($A^{II}$).

Preferably component (A) is prepared before component (B).

The order in which the fractions ($A^I$) and ($A^{II}$) are prepared is not critical.

The polymerization, which can be continuous or batch, is carried out following known techniques and operating in liquid phase, in the presence or not of inert diluent, or in gas phase, or by mixed liquid-gas techniques. It is preferable to carry out the polymerization in gas phase.

Reaction time, pressure and temperature relative to the polymerization steps are not critical, however it is best if the temperature is from 50 to 100° C. The pressure can be atmospheric or higher.

The regulation of the molecular weight is carried out by using known regulators, hydrogen in particular.

The masterbatch compositions of the present invention can also be produced by a gas-phase polymerization process carried out in at least two interconnected polymerization zones. The said type of process is illustrated in European patent application 782 587.

In detail, the above-mentioned process comprises feeding one or more monomer(s) to said polymerization zones in the presence of catalyst under reaction conditions and collecting the polymer product from the said polymerization zones. In the said process the growing polymer particles flow upward through one (first) of the said polymerization zones (riser) under fast fluidization conditions, leave the said riser and enter another (second) polymerization zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example between 50 to 120° C.

This process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The said polymerizations are preferably carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an isotactic index greater than 90%, preferably greater than 95%. Catalysts having the above mentioned characteristics are well known in the patent literature; particularly advantageous are the catalysts described in U.S. Pat. No. 4,399,054 and European patent 45977.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are phthalic acid esters, such as diisobutyl, dioctyl, diphenyl and benzylbutyl phthalate.

Other electron-donors particularly suitable are 1,3-diethers of formula:

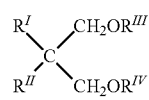

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3- dimethoxypropane, 2-isopropyl-2-isoamyl-1,3-dimethoxypropane, 9,9-bis(methoxymethyl)fluorene.

The preparation of the above mentioned catalyst components is carried out according to various methods.

For example, a MgCl$_2$.nROH adduct (in particular in the form of spheroidal particles) wherein n is generally from 1 to 3 and ROH is ethanol, butanol or isobutanol, is reacted with an excess of TiCl$_4$ containing the electron-donor compound. The reaction temperature is generally from 80 to 120° C. The solid is then isolated and reacted once more with TiCl$_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or SO$_4$ or SO$_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$Si(OCH$_3$)$_2$, (cyclohexyl)(methyl)Si (OCH$_3$)$_2$, (phenyl)$_2$Si(OCH$_3$)$_2$ and (cyclopentyl)$_2$Si(OCH$_3$)$_2$. 1,3-diethers having the formulae described above can also be used advantageously. If the internal donor is one of these diethers, the external donors can be omitted.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the component (B).

The catalysts can be pre-contacted with small amounts of olefins (prepolymerization).

The masterbatch composition of the present invention can also contain additives commonly employed in the art, such as antioxidants, light stabilizers, heat stabilizers, colorants and fillers.

As previously said, the masterbatch composition of the present invention can be advantageously compounded with additional polyolefins, in particular propylene polymers such as propylene homopolymers, random copolymers, and thermoplastic elastomeric polyolefin compositions. Accordingly, a second embodiment of the invention relates to a thermoplastic polyolefin composition suitable for injection molding, containing the above-defined masterbatch compositions. Preferably, the said thermoplastic polyolefin composition comprises up to 30% by weight, typically from 5% to 20% by weight, of the masterbatch composition according to the present invention.

Practical examples of the polyolefins to which the masterbatch is added (i.e. the polyolefins other than those present in the masterbatch) are the following polymers:
1) crystalline propylene homopolymers, in particular isotactic or mainly isotactic homopolymers;
2) crystalline propylene copolymers with ethylene and/or a $C_4$-$C_{10}$ α-olefin, wherein the total comonomer content ranges from 0.05 to 20% by weight with respect to the weight of the copolymer, and wherein preferred α-olefins are 1-butene; 1-hexene; 4-methyl-1-pentene and 1-octene;
3) crystalline ethylene homopolymers and copolymers with propylene and/or a $C_4$-$C_{10}$ α-olefin, such as HDPE;
4) elastomeric copolymers of ethylene with propylene and/or a $C_4$-$C_{10}$ α-olefins, optionally containing minor quantities of a diene, such as butadiene, 1,4-hexadiene, 1,5-hexadiene and ethylidene-1-norbornene, wherein the diene content is typically from 1 to 10% by weight;
5) a thermoplastic elastomeric composition comprising one or more of propylene homopolymers and/or the copolymers of item 2) and an elastomeric moiety comprising one or more of the copolymers of item 4), typically prepared according to known methods by mixing the components in the molten state or by sequential polymerization, and generally containing the said elastomeric moiety in quantities from 5 to 80% by weight.

The polyolefin composition may be manufactured by mixing the masterbatch composition and the additional polyolefin(s) together, extruding the mixture, and pelletizing the resulting composition using known techniques and apparatus.

The polyolefin composition may also contain conventional additives such as mineral fillers, colorants and stabilizers. Mineral fillers that can be included in the composition include talc, CaCO$_3$, silica, such as wollastonite (CaSiO$_3$), clays, diatomaceaous earth, titanium oxide and zeolites. Typically the mineral filler is in particle form having an average diameter ranging form 0.1 to 5 micrometers.

The present invention also provides final articles, such as bumpers and fascia, made of the said polyolefin composition.

The practice and advantages of the present invention are disclosed below in the following examples. These Examples are illustrative only, and are not intended to limit the allowable scope of the invention in any manner whatsoever.

The following analytical methods are used to characterize the polymer compositions.

Melt Flow Rate: ASTM-D 1238, condition L.

[η] intrinsic viscosity: determined in tetrahydronaphtalene at 135° C.

Ethylene content: I.R. Spectroscopy.

Flexural Modulus: ISO 178

Strength at yield: ISO 527

Strength at break: ISO 527

Elongation at break and at yield: ISO 527

Notched IZOD impact test: ISO 180/1A

Polydispersity index (P.I.)

This property is strictly connected with the molecular weight distribution of the polymer under examination. In particular it is inversely proportional to the creep resistance of the polymer in the molten state. Said resistance called modulus separation at low modulus value (500 Pa), was determined at a temperature of 200° C. by using a parallel plates rheometer model RMS-800 marketed by RHEOMETRICS (USA), operating at an oscillation frequency which increases from 0.1 rad/sec to 100 rad/sec. From the modulus separation value, one can derive the P.I. by way of the equation:

$$P.I.=54.6*(\text{modulus separation})^{-1.76}$$

in which the modulus separation is defined as:

$$\text{modulus separation} = \text{frequency at } G'=500 \text{ Pa}/\text{frequency at } G''=500 \text{ Pa}$$

wherein G' is storage modulus and G" is the loss modulus.

Xylene Soluble and Isoluble Fractions 2.5 g of polymer and 250 cm³ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm³ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Cast Film Evaluation

Cast films 100 μm thick are prepared from the compositions of the examples using the filming apparatus Plasticisers MKII.

The extruder has a screw whose diameter and length are respectively 19 and 400 mm.

The die has a width of 80 mm and a die gap of 0.2 mm.

The temperatures of the extruder and the die are of 270° C.

The compositions are classified as "good" when the average diameter of the gels found in the film samples is smaller than 1.5 mm, "bad" when gels having average diameter equal to or greater than the said value are detected.

Tiger Stripes in Blend

In order to evaluate the tiger stripes, the following blends with the compositions of the examples (as reported in Table 2 hereinafter) are prepared in an internal mixer.

Blends for Tiger Stripes evaluation

| Polymer materials (wt %) | MFR L | | | | | |
|---|---|---|---|---|---|---|
| HECO | 2 | 12 | 12 | 12 | 12.5 | 12.5 |
| EPR | 1.5 | 6 | 6 | 6 | 6 | 6 |
| HOMO 1 | 2000 | 22.5 | 22.5 | 22.5 | 22 | 22 |
| HOMO 2 | 400 | — | — | — | — | — |
| EPDM | 0.6 | 11 | 11 | 11 | 11 | 11 |
| Composition of Ex. 1 | | 10 | — | — | — | — |
| Composition of Ex. 2 | | — | 10 | — | — | — |
| Composition of Ex. 3 | | — | — | 10 | — | — |
| Composition of Ex. 4 | | — | — | — | 10 | — |
| Composition of Ex. 1C | | — | — | — | — | 10 |
| Neotalc Natural | | 17.5 | 17.5 | 17.5 | 17.5 | 17.5 |

Notes (all percentages by weight):
HECO = heterophasic copolymer prepared with Ziegler-Natta catalyst and consisting of 44% propylene homopolymer with MFR L of 90 g/10 min. and 56% propylene/ethylene bipolymer with 49% of ethylene, having total MFR L of 2.5 g/10 min.;
EPR = ethylene/propylene rubber prepared with Ziegler-Natta catalyst and containing 60% ethylene, having total MFR L of s 1.5 g/10 min.;
HOMO 1 = propylene homopolymer prepared with Ziegler-Natta catalyst, having MFR L of 2000 g/10 min.;
HOMO 2 = propylene homopolymer prepared with Ziegler-Natta catalyst, having MFR L of 400 g/10 min.;
EPDM = ethylene/propylene/diene rubber prepared with V-based catalyst and containing 66% ethylene and 4.5% ethylidene-norbornene-1, having MFR L of 0.6 g/10 min.;
Neotalc Natural = natural talc.

The plaques used for the Tiger Stripes evaluation (with a length of 250 mm, a width of 150 mm and a thickness of 3 mm) are moulded in an injection press machine Negri Bossi (225 tons of clamping force), under the following conditions:
  screw rotation: 100 rpm
  melt temperature: 215-220° C.
  mould temperature: 55° C.
  injection time: 11 seconds
  holding pressure: 20-30 bar
  holding time: 5 seconds
  cooling time: 40 seconds.

On the so obtained plaques the evaluation is carried out by measuring the distance between the injection point and the first tiger stripe. Obviously, the longer such distance, the better is the tested material in terms of ability to reduce the tiger stripes.

EXAMPLES 1 TO 4 AND COMPARATIVE EXAMPLE 1

The solid catalyst component used in polymerization is a highly stereospecific Ziegler-Natta catalyst component supported on magnesium chloride, containing about 2.5% by weight of titanium and diisobutylphthalate as internal donor, prepared by analogy with the method described in the examples of European published patent application 674991.

Catalyst System and Prepolymerization Treatment

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 15 and in such quantity that the TEAL/Ti molar ratio be equal to 65.

The catalyst system is then subjected to prepolymerization by maintaining it in suspension in liquid propylene at 20° C. for about 20 minutes before introducing it into the first polymerization reactor.

Polymerization

Into a first gas phase polymerization reactor a polypropylene homopolymer (fraction ($A^H$)) is produced by feeding in a continuous and constant flow the prepolymerized catalyst system, hydrogen (used as molecular weight regulator) and propylene in the gas state.

Polymerization conditions are shown in Table 1.

The polypropylene homopolymer produced in the first reactor is discharged in a continuous flow and, after having been purged of unreacted monomers, is introduced, in a continuous flow, into a second gas phase reactor, together with quantitatively constant flows of hydrogen and propylene in the gas state.

In the second reactor a propylene homopolymer (fraction (A$^I$)) is produced. Polymerization conditions, molar ratio of the reactants and composition of the copolymers obtained are shown in Table 1.

The polymer coming from the second reactor is discharged in a continuous flow and, after having been purged of unreacted monomers, is introduced, in a continuous flow, into a third gas phase reactor, together with quantitatively constant flows of hydrogen and ethylene in the gas state.

In the third reactor a propylene/ethylene copolymer (component (B)) is produced. Polymerization conditions, molar ratio of the reactants and composition of the copolymers obtained are shown in Table 1.

The polymer particles exiting the third reactor are subjected to a steam treatment to remove the reactive monomers and volatile substances, and then dried.

Then the polymer particles are introduced in a rotating drum, where they are mixed with 0.05% by weight of paraffin oil ROL/OB 30 (having a density of 0.842 kg/l at 20° C. according to ASTM D 1298 and flowing point of −10° C. according to ASTM D 97), 0.15% by weight of Irganox® B 215 (made of about 34% Irganox® 1010 and 66% Irgafos® 168) and 0.05% by weight of calcium stearate.

The said Irganox 1010 is 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate, while Irgafos 168 is tris(2,4-di-tert.-butylphenyl) phosphite.

Then the polymer particles are introduced in a twin screw extruder Berstorff ZE 25 (length/diameter ratio of screws: 33) and extruded under nitrogen atmosphere in the following conditions:

Rotation speed: 250 rpm;
Extruder output: 6-20 kg/hour;
Melt temperature: 200-250° C.

The characteristics relating to this polymer composition, reported in Table 2, are obtained from measurements carried out on the so extruded polymer.

TABLE 1

| | | Example No. | | | | |
|---|---|---|---|---|---|---|
| | | 1 | 2 | 3 | 4 | 1C |
| 1$^{st}$ Reactor | | | | | | |
| Temperature | ° C. | | | | 70 | |
| Pressure | barg | 18.0 | 18.0 | 18.0 | 18.0 | 18.0 |
| H2/C3- | mol. | 0.03 | 0.03 | 0.03 | 0.12 | 0.12 |
| Split | wt % | 35 | 39 | 25.3 | 35.2 | 41.7 |
| MFR$^{II}$ | g/10' | 19.3 | 18.3 | 21.4 | 64.2 | 57.7 |
| Xylene soluble | wt % | 2.3 | 2.2 | 2.3 | 2.3 | 2.9 |
| 2$^{nd}$ Reactor | | | | | | |
| Temperature | ° C. | | | | 80 | |
| Pressure | barg | 24.0 | 24.0 | 24.0 | 24.0 | 24.0 |
| H2/C3- | mol. | 0.001 | 0.001 | 0.002 | 0.002 | 0.001 |
| Split | wt % | 29.5 | 29 | 43.2 | 33.8 | 27.8 |
| MFR$^I$ | g/10' | 0.84 | 0.61 | 1.80 | 1.50 | 0.47 |
| MFR L of stage | g/10' | 4.6 | 4.3 | 4.5 | 10.2 | 8.4 |
| Xylene soluble | wt % | 2.3 | 2.3 | 2.3 | 2.4 | 2.6 |
| P.I. | | 4.8 | 4.9 | 4.5 | 5.4 | 6.2 |
| MFR$^{II}$/MFR$^I$ | | 23.0 | 30.0 | 11.9 | 42.8 | 122.8 |
| 3$^{rd}$ Reactor | | | | | | |
| Temperature | ° C. | | | | 60 | |
| Pressure | barg | 16.0 | 16.0 | 16.0 | 16.0 | 16.0 |
| H2/C2- | mol. | N.D. | N.D. | N.D. | 0.002 | 0.002 |
| C2-/(C2- + C3-) | mol. | 0.25 | 0.17 | 0.16 | 0.17 | 0.24 |

TABLE 1-continued

| | | Example No. | | | | |
|---|---|---|---|---|---|---|
| | | 1 | 2 | 3 | 4 | 1C |
| Split | wt % | 35.5 | 32 | 31.5 | 31 | 30.5 |
| C2- in (B) | wt % | 40.5 | 32 | 32.5 | 33 | 44 |

Notes:
C3- = propylene;
C2- = ethylene;
split = amount of polymer produced in the concerned reactor.

TABLE 2

| | | Example No. | | | | |
|---|---|---|---|---|---|---|
| | | 1 | 2 | 3 | 4 | 1C |
| MFR L | g/10' | 0.52 | 0.58 | 0.49 | 0.76 | 0.93 |
| Xylene soluble | wt % | 32.8 | 30.1 | 29.9 | 29.3 | 28.2 |
| C2- content | wt % | 14.4 | 10.1 | 10.3 | 10.3 | 13.4 |
| X.S.I.V. before extrusion | dl/g | 6.34 | 7.02 | 7.24 | 6.58 | 6.59 |
| X.S.I.V. after extrusion | dl/g | 5.22 | 5.60 | 5.73 | 6.12 | 6.31 |
| Flexural modulus | MPa | 768 | 814 | 739 | 795 | 930 |
| Strength at yield | MPa | 16.4 | 19.2 | 18.3 | 18.0 | 18.7 |
| Elongation at yield | % | 12.0 | 13.2 | 15.3 | 14.7 | 10.6 |
| Strength at break | MPa | 25.0 | 33.0 | >26.0 | 30.0 | 29.0 |
| Elongation at break | % | 530 | 550 | >660 | 516 | 490 |
| Izod at 23° C. | KJ/m$^2$ | N.B. | N.B. | N.B. | N.B. | N.B. |
| Izod at −30° C. | KJ/m$^2$ | N.B. | 12.6 | 14.0 | 13.5 | 15.0 |
| Cast film evaluation | | good | good | good | good | bad |
| Tiger Stripes starting point (in blend) | mm | 130 | 141 | 162 | 185 | 120 |

Notes:
X.S.I.V = Intrisic Viscosity of the fraction soluble in xylene;
N.B. = No Breakage.

The invention claimed is:

1. A masterbatch composition comprising (percent by weight):
   A) 50%-90% of a crystalline polypropylene component comprising:
      A$^I$) from 25% to 75% of a fraction having a melt flow rate MFR$^I$ of from 0.1 to 10 g/10 min.; and
      A$^{II}$) from 25% to 75% of a fraction having a melt flow rate value MFR$^{II}$ from 10 to 68 g/10 min.;
      wherein a ratio MFR$^{II}$/MFR$^I$ is from 5 to 60, and the fractions A$^I$) and A$^{II}$) are independently selected from the group consisting of a propylene homopolymer, a random copolymer of propylene containing up to 3% of ethylene, and a random copolymer of propylene containing up to 6% of at least one C4-C10 α-olefin; and
   B) 10%-50% of a copolymer component comprising ethylene and at least one C$_3$-C$_{10}$ α-olefin, the copolymer containing from 15% to 50% of ethylene, and optionally minor amounts of a diene;
   said masterbatch composition having an MFR and a value of the intrinsic viscosity [η] of a fraction soluble in xylene at room temperature (about 25° C.) of at least 3.5 dl/g.

2. The masterbatch composition of claim 1 wherein the MFR is 0.1 to 10 g/10 min.

3. A thermoplastic polyolefin composition comprising a masterbatch composition and at least one olefin polymer different from the masterbatch composition, the masterbatch composition comprising (percent by weight):
   A) 50%-90% of a crystalline polypropylene component comprising:
   $A^I$) from 25% to 75% of a fraction having a melt flow rate $MFR^I$ of from 0.1 to 10 g/10 min.; and
   $A^{II}$) from 25% to 75% of a fraction having a melt flow rate value $MFR^{II}$ from 10 to 68 g/10 min.;
   wherein a ratio $MFR^{II}/MFR^I$ is from 5 to 60, and the fractions $A^I$) and $A^{II}$) are independently selected from the group consisting of a propylene homopolymer, a random copolymer of propylene containing up to 3% of ethylene, and a random copolymer of propylene containing up to 6% of at least one C4-C10 α-olefin; and
   B) 10%-50% of a copolymer component comprising ethylene and at least one $C_3$-$C_{10}$ α-olefin, the copolymer containing from 15% to 50% of ethylene, and optionally minor amounts of a diene;
   said masterbatch composition having an MFR and a value of the intrinsic viscosity [η] of a fraction soluble in xylene at room temperature (about 25° C.) at least 3.5 dl/g.

4. The thermoplastic polyolefin composition of claim 3, wherein the masterbatch composition is present in an amount from 5% to 20% by weight with respect to the total weight of the thermoplastic composition.

5. The thermoplastic polyolefin composition of claim 3, wherein the olefin polymers other than those contained in the masterbatch composition are selected from the group consisting of:
   1) crystalline propylene homopolymers;
   2) crystalline copolymers of propylene with at least one of ethylene and a $C_4$-$C_{10}$ α-olefin, wherein the total comonomer content ranges from 0.05 to 20% by weight with respect to the weight of the copolymer;
   3) crystalline ethylene homopolymers and copolymers with at least one of propylene and $C_4$-$C_{10}$ α-olefins;
   4) elastomeric copolymers of ethylene with at least one of propylene and a $C_4$-$C_{10}$ α-olefin, optionally containing minor quantities of a diene;
   5) a thermoplastic elastomeric composition comprising at least one of propylene homopolymers and the copolymers of item 2) and an elastomeric moiety comprising at least one of the copolymers of item 4), containing the elastomeric moiety in quantities from 5 to 80% by weight; and
   6) blends of at least two of the polymers or compositions of items 1) to 5).

6. A process for preparing a masterbatch composition comprising (percent by weight):
   A) 50%-90% of a crystalline polypropylene component comprising:
   $A^I$) from 25% to 75% of a fraction having a melt flow rate $MFR^I$ of from 0.1 to 10 g/10 min.; and
   $A^{II}$) from 25% to 75% of a fraction having a melt flow rate value $MFR^{II}$ from 10 to 68 g/10 min.;
   wherein a ratio $MFR^{II}/MFR^I$ is from 5 to 60, and the fractions $A^I$) and $A^{II}$) are independently selected from the group consisting of a propylene homopolymer, a random copolymer of propylene containing up to 3% of ethylene, and a random copolymer of propylene containing up to 6% of at least one C4-C10 α-olefin; and
   B) 10%-50% of a copolymer component comprising ethylene and at least one $C_3$-$C_{10}$ α-olefin, the copolymer containing from 15% to 50% of ethylene, and optionally minor amounts of a diene;
   said masterbatch composition having an MFR and a value of the intrinsic viscosity [η] of a fraction soluble in xylene at room temperature (about 25° C.) of at least 3.5 dl/g;
   the process comprising polymerizing at least one monomer in a sequential polymerization, comprising at least three sequential steps, wherein components (A) and (B) are prepared in separate subsequent steps, operating in each step, except the first step, in the presence of the polymer formed and the catalyst used in the preceding step.

7. Bumpers and fascia comprising a masterbatch composition—comprising (percent by weight):
   A) 50%-90% of a crystalline polypropylene component comprising:
   $A^I$) from 25% to 75% of a fraction having a melt flow rate $MFR^I$ of from 0.1 to 10 g/10 min.; and
   $A^{II}$) from 25% to 75% of a fraction having a melt flow rate value $MFR^{II}$ from 10 to 68 g/10 min.;
   wherein a ratio $MFR^{II}/MFR^I$ is from 5 to 60, and the fractions $A^I$) and $A^{II}$) are independently selected from the group consisting of a propylene homopolymer, a random copolymer of propylene containing up to 3% of ethylene, and a random copolymer of propylene containing up to 6% of at least one C4-C10 α-olefin; and
   B) 10%-50% of a copolymer component comprising ethylene and at least one $C_3$-$C_{10}$ α-olefin, the copolymer containing from 15% to 50% of ethylene, and optionally minor amounts of a diene;
   said masterbatch composition having an MFR and a value of the intrinsic viscosity [η] of a fraction soluble in xylene at room temperature (about 25° C.) of at least 3.5 dl/g.

* * * * *